(12) United States Patent
Bock

(10) Patent No.: US 8,011,618 B2
(45) Date of Patent: Sep. 6, 2011

(54) STORAGE DEVICE FOR BAGGAGE FOR AN AIRCRAFT CABIN

(75) Inventor: Thomas-Mathias Bock, Grenade-sur-Garonne (FR)

(73) Assignee: Airbus, Blagnac (FR)

( * ) Notice: Subject to any disclaimer, the term of this patent is extended or adjusted under 35 U.S.C. 154(b) by 411 days.

(21) Appl. No.: 11/589,248

(22) Filed: Oct. 30, 2006

(65) Prior Publication Data

US 2007/0095981 A1 May 3, 2007

Related U.S. Application Data

(60) Provisional application No. 60/749,627, filed on Dec. 13, 2005.

(30) Foreign Application Priority Data

Oct. 28, 2005 (FR) ..................................... 05 11027

(51) Int. Cl.
*B64C 1/20* (2006.01)
*B64C 1/22* (2006.01)
*B64D 47/00* (2006.01)

(52) U.S. Cl. .................................. 244/118.1; 296/37.8

(58) Field of Classification Search ............... 244/118.1, 244/118.5, 137.2; 296/37.8; 312/319.1, 312/319.2, 325
See application file for complete search history.

(56) References Cited

U.S. PATENT DOCUMENTS

| | | | | |
|---|---|---|---|---|
| 4,368,937 A * | 1/1983 | Palombo et al. | ............... | 312/325 |
| 5,108,048 A * | 4/1992 | Chang | ........................ | 244/118.1 |
| 5,129,597 A * | 7/1992 | Manthey et al. | ........... | 244/118.5 |
| 5,244,269 A * | 9/1993 | Harriehausen et al. | ....... | 312/247 |
| 5,347,434 A * | 9/1994 | Drake | ........................... | 362/472 |
| 5,383,628 A * | 1/1995 | Harriehausen et al. | .... | 244/118.1 |
| 5,395,074 A | 3/1995 | Hart et al. | | |
| 5,422,794 A * | 6/1995 | Drake | ........................... | 362/471 |
| 5,456,529 A * | 10/1995 | Cheung | ........................ | 312/245 |
| 5,687,929 A * | 11/1997 | Hart et al. | .................. | 244/118.1 |
| 5,820,076 A * | 10/1998 | Schumacher et al. | ..... | 244/118.5 |
| 5,842,668 A * | 12/1998 | Spencer | ..................... | 244/118.1 |
| 5,868,353 A | 2/1999 | Benard | | |
| 5,938,149 A * | 8/1999 | Terwesten | .................. | 244/118.5 |

(Continued)

FOREIGN PATENT DOCUMENTS

AT 410536 5/2003

(Continued)

OTHER PUBLICATIONS

U.S. Appl. No. 11/589,193, filed Oct. 30, 2006, Bock.

(Continued)

*Primary Examiner* — Tien Dinh
*Assistant Examiner* — Philip J Bonzell
(74) *Attorney, Agent, or Firm* — Oblon, Spivak, McClelland, Maier & Neustadt, L.L.P.

(57) ABSTRACT

A storage device for baggage for an aircraft cabin includes a compartment having a lower face and an upper face, an open face allowing access to the compartment for the depositing and removal of baggage inside same and a back, opposite the open face of the compartment. The lower face of the compartment is substantially plane on the side of the open face and rises up near the back. A groove, the concavity of which is positioned toward the upper face of the compartment, is implemented in the joining zone between the raised portion of the lower face and the back.

22 Claims, 1 Drawing Sheet

U.S. PATENT DOCUMENTS

| | | | |
|---|---|---|---|
| 6,241,186 B1 * | 6/2001 | Calnon | 244/118.5 |
| 6,398,163 B1 * | 6/2002 | Welch et al. | 244/118.1 |
| 6,857,603 B2 * | 2/2005 | Lau et al. | 244/118.1 |
| 7,090,314 B2 * | 8/2006 | Burrows et al. | 312/246 |
| 7,143,977 B2 * | 12/2006 | Graf et al. | 244/118.1 |
| 7,234,666 B2 * | 6/2007 | Novak et al. | 244/118.5 |
| 7,258,406 B2 * | 8/2007 | Stephan et al. | 312/246 |
| 2001/0011692 A1 | 8/2001 | Sprenger et al. | |
| 2002/0101090 A1 | 8/2002 | Steingrebe et al. | |
| 2004/0245897 A1 | 12/2004 | Stephan et al. | |
| 2005/0064174 A1 | 3/2005 | Gideon et al. | |
| 2005/0230541 A1 * | 10/2005 | Graf et al. | 244/118.5 |
| 2006/0237585 A1 * | 10/2006 | Lau et al. | 244/118.5 |

FOREIGN PATENT DOCUMENTS

| | | |
|---|---|---|
| DE | 44 25 869 | 2/1996 |
| EP | 0 614 806 | 9/1994 |
| RU | 2 235 663 C2 | 6/2003 |

OTHER PUBLICATIONS

U.S. Appl. No. 11/589,203, filed Oct. 30, 2006, Bock.
U.S. Appl. No. 12/374,756, filed Jan. 22, 2009, Bock.

\* cited by examiner

STORAGE DEVICE FOR BAGGAGE FOR AN AIRCRAFT CABIN

CROSS-REFERENCE TO RELATED APPLICATIONS

This document claims priority to French Application Number 05 11027, filed Oct. 28, 2005 and U.S. Provisional Application No. 60/749,627, filed Dec. 13, 2005, the entire contents of which are hereby incorporated by reference.

BACKGROUND OF THE INVENTION

1. Field of the Invention

This invention relates to a baggage storage space intended in particular for an aircraft cabin, and more specifically a baggage rack.

The field of this invention is the transport of passengers in an aircraft. During a trip, the travelers' baggage is placed in the holds of the aircraft, while lighter baggage can accompany the travelers in the aircraft cabin. In this cabin, storage spaces are provided for this baggage, also referred to as hand baggage. More often than not, these storage spaces are arranged in the upper portion of the aircraft cabin, beneath the ceiling of this cabin and above the seats intended to accommodate the passengers.

2. Description of the Related Art

There are two major types of storage space for baggage such as described previously. On the one hand there are baggage bins and on the other hand baggage racks. A baggage bin is a compartment fixed in relation to the aircraft cabin, and a door, generally pivoting, allows the opening and closing of access to the baggage compartment. A baggage rack, for its part, also has a compartment intended to accommodate baggage and comprising an access. Here this compartment is a compartment movable between a first extended position in which access to the compartment is open, allowing the insertion and removal of baggage, and a position retracted inside the ceiling of the aircraft cabin, in which access to the compartment is closed.

The current trend, dictated by the airline companies, is to increase the volume of storage space for hand baggage inside aircraft cabins. However, the volume inside an aircraft cabin is limited. It therefore is advisable to make the most of the available space inside a given cabin. Moreover, as regards the baggage racks and bins, their dimensions are limited inasmuch as the standards provide that these storage spaces, in open or closed position, must not hinder the movement of passengers in the aisles of the aircraft cabin.

SUMMARY OF THE INVENTION

This invention then has as a purpose to provide a baggage compartment that, for a given external occupied space, makes possible a greater volume of storage space for baggage than the known storage spaces of the prior art.

To this end, it proposes a storage space for baggage, intended in particular for an aircraft cabin, comprising a compartment having a lower face and an upper face, an open face allowing access to the compartment for the depositing and removal of baggage or similar items inside same, and a back, opposite the open face of the compartment.

According to this intention, the lower face of the compartment is more or less plane on the side of the open face, the lower face of the compartment rises up near the back, and a groove, the concavity of which is positioned toward the upper face of the compartment, is implemented in the joining zone between the raised portion of the lower face and the back With such a storage space, a suitcase with wheels can be accommodated in the baggage compartment in the lengthwise direction and not down flat, but diagonally. The wheels of the suitcase are introduced first when the compartment is open. They then come to roll over the plane portion of the lower face and the raised portion of this face then comes to guide them into the groove that is intended to accommodate them. The suitcase then is held in the compartment of the baggage storage space thanks to the cooperation of the wheels of the suitcase with the groove.

In order to better support a suitcase placed in the baggage storage space, or to hold a possible suitcase not comprising wheels, the free edge of the lower face of the compartment situated on the side of the open face for access to the compartment advantageously has a rim projecting from the lower face of the compartment toward the upper face of the latter. This rim can be formed, for example, by a profiled part. Preferably, in order to avoid injuring a user or damaging a piece of baggage, this rim, profiled or otherwise, is rounded.

In order to facilitate the positioning of a suitcase in the compartment, the raised portion of the lower face of the compartment rises up gradually from the plane portion to the groove.

In a variation of embodiment, the raised portion of the lower face of the compartment represents between 15 and 40% of the lower face of the compartment. Thus, the volume occupied by the raised portion is not too great and this raised portion can have a slope that is not too great so as to facilitate the accommodation of the baggage.

By way of illustrative example, it is indicated here that the groove is, for example, between 5 and 30 cm above the level of the plane portion of the lower face of the compartment.

In a preferred embodiment of the storage space for baggage according to the invention, this rack is movable between a lower open position and a raised position retracted inside an aircraft cabin ceiling. In a variation of embodiment of this storage space (which here is a baggage rack), the plane portion of the lower face of the compartment, in the open position of the compartment, is more or less horizontal, that is, more or less parallel to the floor of the aircraft cabin. These characteristics make it possible to limit the height of the entry threshold of the compartment accommodating the baggage, thus facilitating the use of this baggage rack.

This invention also relates to an aircraft cabin and an aircraft, characterized in that they comprise a baggage storage space such as described above, and more specifically such a baggage rack.

BRIEF DESCRIPTION OF THE DRAWINGS

Details and advantages of this invention will emerge more clearly from the description that follows, presented with reference to the attached schematic drawings on which:

FIG. 1 is a schematic view of a rack according to the invention in closed position, while

DETAILED DESCRIPTION OF THE PREFERRED EMBODIMENTS

Figure 1:
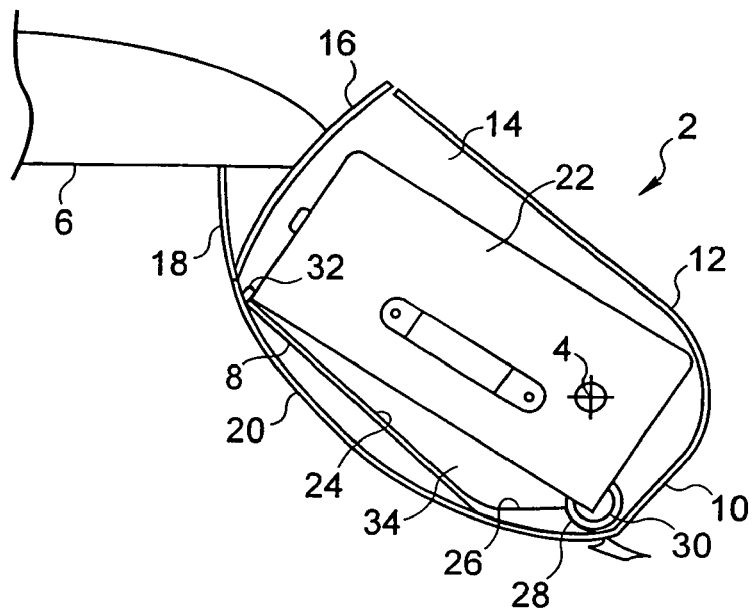

The baggage rack 2 depicted in the drawings is a rack mounted pivoting around an axis of pivoting 4. It is a matter here of a baggage rack 2 mounted in an aircraft cabin. This rack is mounted in the upper portion of this cabin, above the passenger seats, not depicted. The axis of pivoting 4 is a longitudinal axis in relation to the aircraft cabin. The ceiling 6 of this cabin is recognizable on the drawings.

The baggage rack 2 comprises a lower face 8, a back 10, an upper surface 12 and lateral walls 14. The overall shape of this rack is more or less parallelepipedal. The face opposite the back 10 is a completely open face.

On FIG. 1, the baggage rack 2 is depicted in its closed position. It then is retracted in the ceiling 6 of the aircraft cabin. Inside this ceiling, a fixed flap 16 comes to close the open face of the baggage rack, opposite the back 10. This fixed flap 16 takes on, for example, the form of a circular cylindrical section, the axis of which corresponds to the axis of pivoting 4.

For esthetic reasons, a streamlining is provided in order to conceal the baggage rack. In closed position of the latter, the streamlining completely hides the baggage rack 2 from the sight of the passengers occupying the aircraft cabin. This streamlining comprises a fixed streamlining 18 connecting one edge of the fixed flap 16 to the ceiling 6 and a mobile streamlining 20 covering in particular the lower face 8 of this baggage rack 2.

Figure 2:
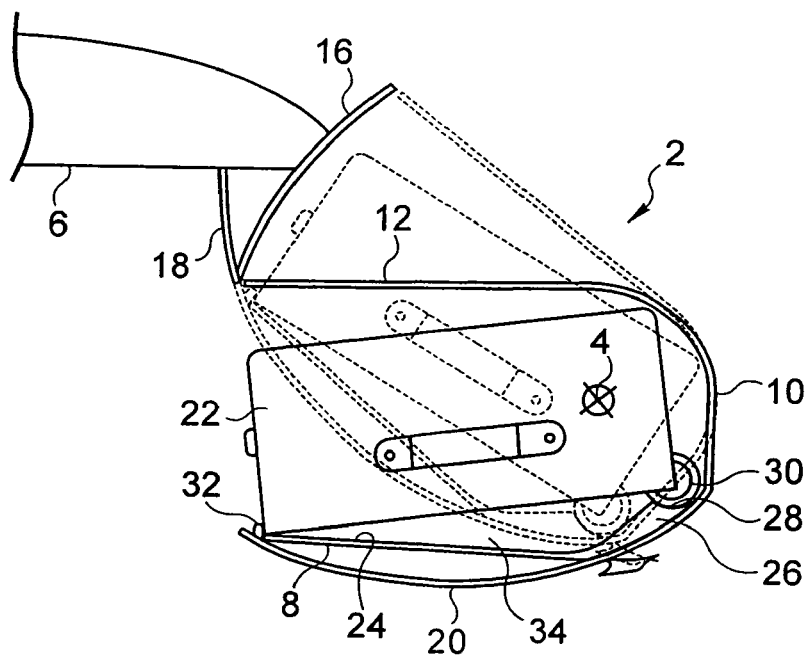
FIG. 2 shows this rack schematically in open position.

FIG. 2 depicts the baggage rack in its open position. In order to go from the closed position depicted on FIG. 1 to the open position of FIG. 2, the baggage rack 2 pivots downward around its axis of pivoting 4. In this position, the fixed flap 16 no longer covers the open face of the rack and this open face is completely clear. A passenger then can place a suitcase 22 inside the rack or remove it therefrom.

The lower face 8 of the baggage rack 2 has a plane portion on the side of the open face of the rack. This plane portion 24, in the embodiment depicted in the drawings, extends over approximately 70% of the depth of the baggage rack. Then, on nearing the back 10 of the baggage rack 2, the lower face 8 has a raised portion 26 positioned toward the upper face 12. Thus, on the attached Figures corresponding more or less to a cross section, the lower face 8 of the baggage rack 2 has an angled shape.

The free end of the raised portion 26 has a groove 28. The latter therefore is in the immediate vicinity of the back 10. This groove 28 is of circular cylindrical form. Its concavity is positioned toward the upper face 12 of the baggage rack 2. This groove 28 is of a size suitable for accommodating a wheel 30 of a suitcase 22. Thus the radius of curvature of the groove 28 is, for example, on the order of 3 to 10 cm.

At the present time, a very great majority of suitcases have wheels 30. The placement of a suitcase 22 with wheels 30 then is performed in the following manner. The baggage rack 2 is set in its open position depicted on FIG. 2. The suitcase 22 then is positioned so that these wheels 30 are introduced first inside the baggage rack 2 and come to roll over the plane portion 24 of the lower face 8 of the baggage rack 2. On approaching the back 10 of the baggage rack, the raised portion 26 of the lower face 8 guides the wheels 30 toward the groove 28. The suitcase 22 then is in place in the baggage rack 2. It is held in this rack thanks to the cooperation of the wheels 30 and the groove 28. This loading process is quite natural for the passenger who prefers to position the handle of his baggage on the accessible side of the rack.

The plane portion 24 of the lower face 8 of the baggage rack 2 preferably is more or less horizontal when the baggage rack 2 is in its open position. The aircraft here is considered to be down on the ground. In this case, the floor of the aircraft cabin is itself more or less horizontal. Thus, in relation to the aircraft cabin, it may be considered that the plane portion 24 of the lower face 8 of the baggage rack 2 is more or less parallel to the floor (and/or to the ceiling) of the aircraft cabin when the baggage rack is in open position.

In order to better hold the suitcase 22 inside the baggage rack 2, it also is provided to equip the free edge of the lower face 8 situated on the side of the open face of the baggage rack 2 with a profiled rail 32 forming a slight projection above the plane portion 24 of the lower face 8 of the baggage rack 2. This profiled rail 32 thus forms a barrier for any object situated on the lower face 8 of the baggage rack 2. In order to avoid damaging the baggage or other objects in place in the baggage rack 2, and especially in order to avoid any injury to the passengers using the baggage rack 2, the profiled rail has a somewhat rounded form.

Such an embodiment of a baggage rack makes it possible, for the same external occupied space, to accommodate baggage of a larger size. In relation to a baggage rack of the state of the art, the baggage rack 2 described above makes possible a saving on the order of 3" (or approximately 7 to 8 cm) in space occupied crosswise. It should be mentioned here that the baggage racks in an aircraft cabin, even in open position, must not hinder the movement of passengers circulating in the aisles provided for this purpose. The baggage racks therefore must not project beyond the cabin seats, above the traffic aisles. Thanks to the space saving achieved, it becomes possible to place a suitcase 22 corresponding to the maximum size generally accepted by the airline companies in the aircraft cabin (usually referred to as "traveler pro") crosswise in the baggage rack, while in the baggage racks of the prior art, storage for such suitcases had to be implemented longitudinally. The space saving is very appreciable. With a rack of the prior art, the space sufficing to accommodate four suitcases of traveler pro size in a rack according to the invention scarcely can hold two suitcases of the same size.

The volume 34 existing between the lower face 8 of the baggage rack 2 according to the invention and the suitcase 22 is not a wasted space—quite the reverse. A passenger could take advantage of this volume to store therein, in complete safety, various small-sized objects and in particular a jacket or similar item. Since this volume 34 is well defined, the objects that are placed there also are held there.

This invention is not restricted to the preferred embodiment described above by way of non-limitative example. It also relates to all the variations within the reach of the individual skilled in the trade, in the context of the claims below.

Thus, for example, the storage space described above and depicted in the drawing is a baggage rack having a compartment intended to accommodate baggage that is movable. This storage space also could be a baggage bin with a fixed compartment, closed by an access door, for example.

What is claimed as new and desired to be secured by Letters Patent of the United States is:

1. A storage device for baggage for an aircraft cabin, comprising:
   a compartment having a lower face, an upper face, an open face allowing access to the compartment for depositing and removal of baggage, and a back located opposite to the open face of the compartment,
   wherein the lower face of the compartment is positioned on a side of the open face and includes a substantially planar portion,
   wherein the lower face of the compartment includes a ramp portion positioned closer to the back than to the open face and positioned between the planar portion and the back,
   wherein a highest point of the ramp portion is positioned above a highest point of the planar portion,
   wherein a groove, a concavity of which opens toward the upper face of the compartment, is implemented between a highest point of the ramp portion of the lower face and the back, such that the ramp portion does not contact the back, and wherein a lowest point of the groove is located above a surface of the planar portion of the lower face of the compartment when the compartment is in an open position.

2. The storage device for baggage according to claim 1, wherein the ramp portion of the lower face of the compartment rises up gradually from the planar portion to the groove.

3. The storage device for baggage according to claim 1, wherein the ramp portion of the lower face of the compartment represents between 15% and 40% of the lower face of the compartment.

4. The storage device for baggage according to claim 1, wherein the groove is located between 5 and 30 cm above the level of the planar portion of the lower face of the compartment when the compartment is in the open position.

5. The storage device for baggage according to claim 1, wherein the groove accommodates wheels of a suitcase.

6. The storage device for baggage according to claim 1, wherein a radius of curvature of the groove is 3 to 10 cm.

7. The storage device for baggage according to claim 1, wherein the device accommodates a traveler pro size suitcase in a crosswise direction.

8. The storage device for baggage according to claim 1, wherein the planar portion between the open face and the ramp portion extends over approximately 70% of a depth of the device.

9. The storage device for baggage according to claim 1, wherein the device includes a single planar portion extending from the open face to a single ramp portion.

10. The storage device for baggage according to claim 1, wherein a free edge of the lower face of the compartment situated on the side of the open face has a rim projecting from the lower face of the compartment toward the upper face of the compartment.

11. The storage device for baggage according to claim 10, wherein the rim is formed by a profiled part.

12. The storage device for baggage according to claim 10, wherein the rim is rounded.

13. The storage device for baggage according to claim 10, wherein the rim forms a barrier for an object situated on the lower face of the compartment.

14. The storage device for baggage according to claim 1, wherein the compartment is movable between a lower position and a raised retracted position inside an aircraft ceiling.

15. The storage device for baggage according to claim 14, wherein the planar portion of the lower face of the compartment in an open position of the compartment is substantially parallel to a floor of the aircraft cabin.

16. An aircraft cabin comprising at least one baggage storage device according to claim 1.

17. An aircraft comprising the aircraft cabin according to claim 16.

18. A storage device for baggage for an aircraft cabin, comprising:

a compartment having a lower face, an upper face, an open face allowing access to the compartment for depositing and removal of baggage, and a back located opposite to the open face of the compartment, wherein the lower face of the compartment is positioned on a side of the open face and includes a substantially planar portion, the lower face of the compartment includes a ramp portion positioned closer to the back than to the open face and positioned between the planar portion and the back, a highest point of the ramp portion is positioned above a highest point of the planar portion, a groove, a concavity of which opens toward the upper face of the compartment, is implemented between the ramp portion of the lower face and the back, such that the ramp portion does not contact the back, a lowest point of the groove is located above a surface of the planar portion of the lower face of the compartment when the compartment is in an open position, in the open position, the open face is uncovered, in a closed position, the open face is covered, the compartment pivots downward around an axis of pivoting to move from the closed position to the open position, and the axis of pivoting is fixed and passes through a side face of the compartment.

19. The storage device for baggage according to claim 18, wherein the ramp portion of the lower face of the compartment rises along a substantially planar portion from the planar portion to the groove.

20. The storage device for baggage according to claim 18, wherein the groove is located between 5 and 30 cm above a level of the planar portion of the lower face of the compartment.

21. The storage device for baggage according to claim 18, wherein the ramp portion includes a planar portion substantially parallel to a ceiling of the aircraft when the storage device is in the closed position.

22. The storage device for baggage according to claim 18, wherein the groove is located between 5 and 30 cm above a level of the planar portion of the lower face of the compartment when the compartment is in the open position.

* * * * *